United States Patent [19]

Miller

[11] 4,333,891
[45] Jun. 8, 1982

[54] TAMPER PROOF SEALING PLUG

[75] Inventor: Robert J. Miller, Warren, Mich.

[73] Assignee: Colt Industries Operating Corp, New York, N.Y.

[21] Appl. No.: 225,986

[22] Filed: Jan. 19, 1981

Related U.S. Application Data

[62] Division of Ser. No. 39,192, May 15, 1979, Pat. No. 4,283,353.

[51] Int. Cl.³ .................... F16K 35/00; F16L 55/10
[52] U.S. Cl. ...................... 261/41 D; 261/DIG. 38; 261/DIG. 84; 137/382; 138/89
[58] Field of Search .................... 137/382; 138/89; 251/DIG. 4; 261/71, DIG. 38, 41 D, DIG. 84

[56] References Cited

U.S. PATENT DOCUMENTS 3,156,373  11/1964  Willis ............................. 138/89 X
3,525,365  8/1970  Meulendyk ..................... 138/89 O
4,120,918  10/1978  Codling ......................... 137/384 X

FOREIGN PATENT DOCUMENTS 2352955  9/1975  France ......................... 261/DIG. 38

*Primary Examiner*—A. Michael Chambers
*Attorney, Agent, or Firm*—Walter Potoroka, Sr.

[57] ABSTRACT

A fuel metering apparatus, for supplying metered fuel to an associated combustion engine, has an idle fuel metering and supply system comprising adjustable valving means which, in turn, comprises a discharge orifice means and cooperating valving member which is adjustably selectively positioned with respect to such orifice means in order to thereby establish a desired metered rate of fuel flow through the thusly determined effective flow area of the orifice means for a particular pressure differential thereacross; the adjustable valving member is generally contained within a cooperating body member or portion and access to the valving member, subsequent to it being selectively positioned, is prevented by a closure member or sealing plug placed in position after the said selective positioning of said valving member; the sealing plug is formed as by a hardened metal disc and caged within a body which body is held by the cooperating body member containing the valving member; relative rotation as between the caging body and the hardened disc is permitted thereby making drilling through the disc impossible.

7 Claims, 12 Drawing Figures

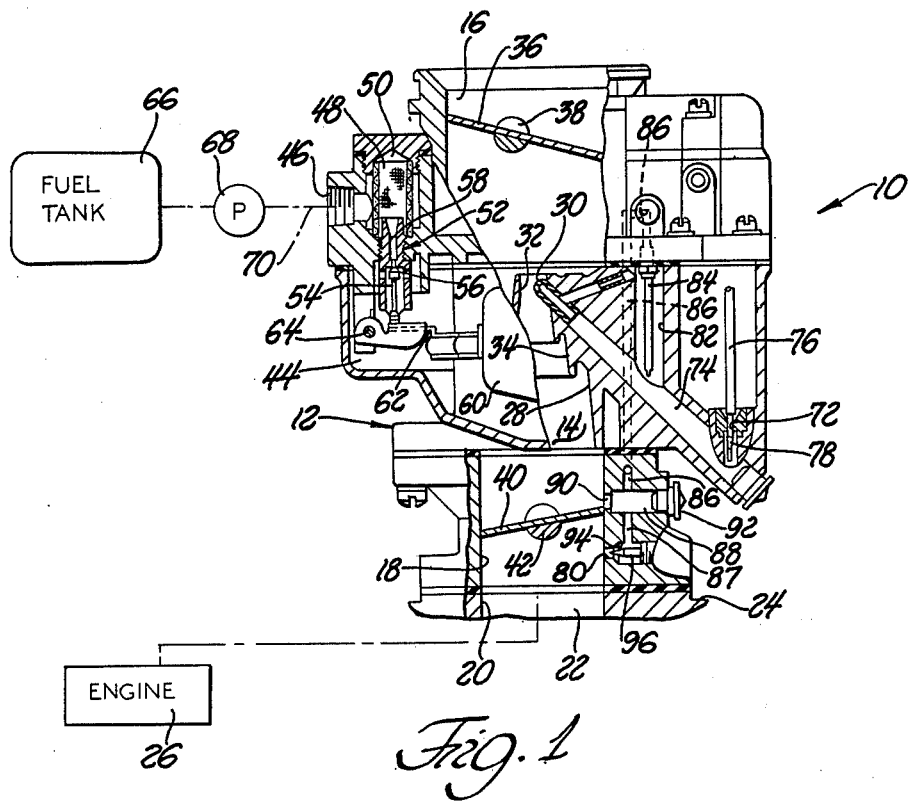
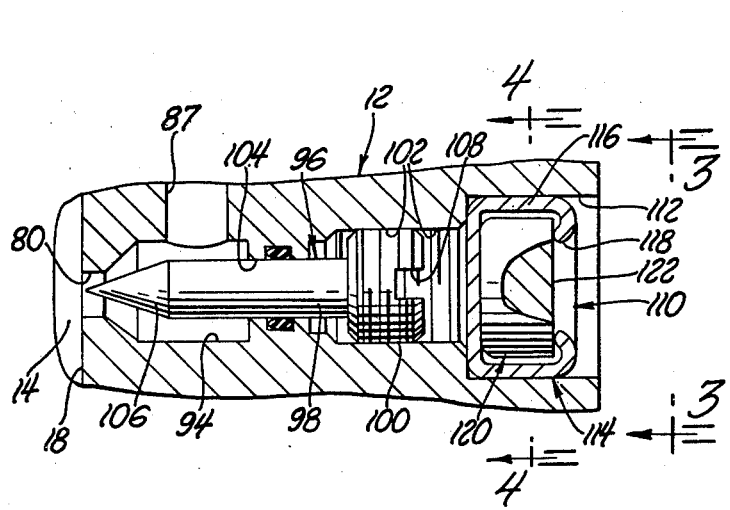
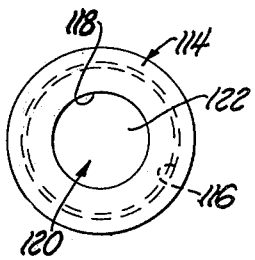
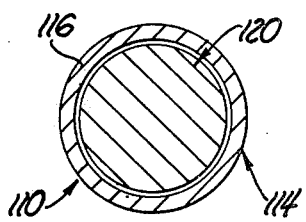

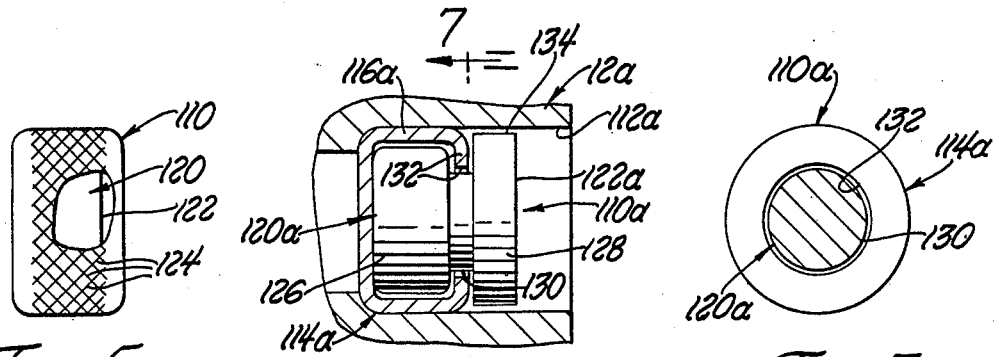
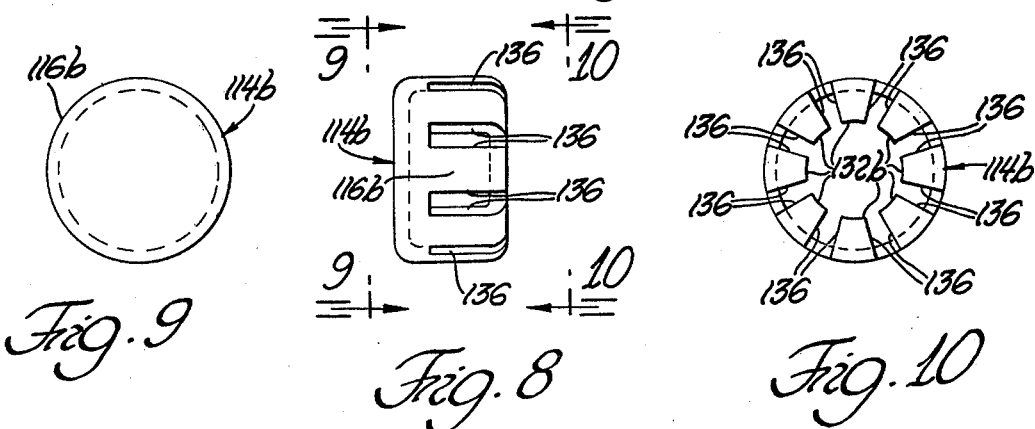
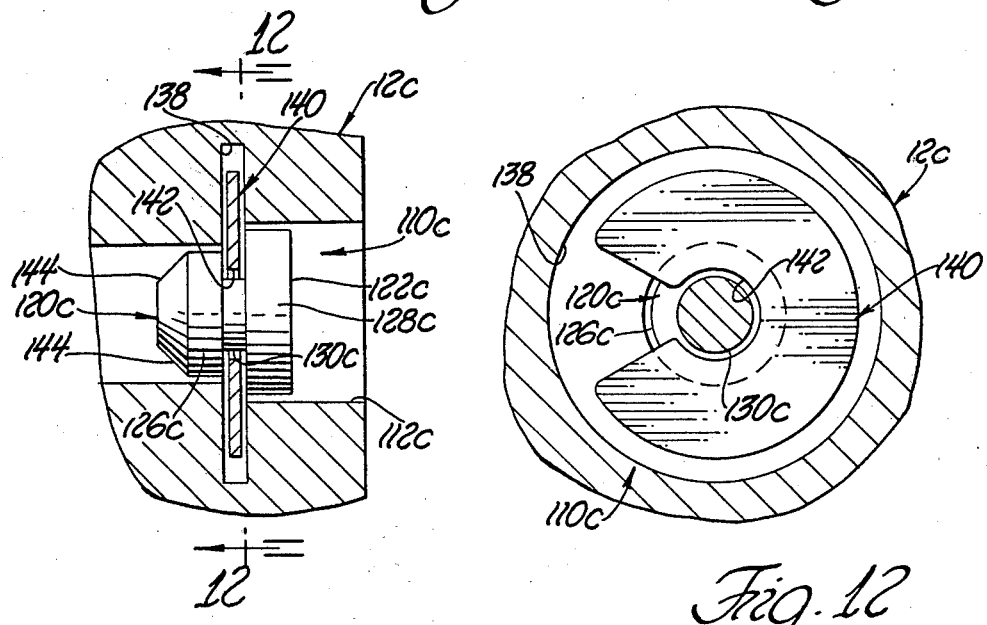

TAMPER PROOF SEALING PLUG

This is a division of application Ser. No. 039,192, filed May 15, 1979 now U.S. Pat. No. 4,283,353 filed on Aug. 11, 1981.

BACKGROUND OF THE INVENTION

Although the industry has made significant improvements in the field of fuel metering, various levels of government have, nevertheless, unilaterally established strict limits on vehicular engine exhaust emissions such as, for example, oxides of nitrogen, unburned hydrocarbons and carbon monoxide. There are, obviously, many influencing factors collectively determining the degree of such exchaust emissions from any particular vehicle and engine. For example, engine spark timing, mode of engine operation (whether hot or cold and whether accelerating or decelerating), fuel metering head in the fuel bowl, degree of pressure dtop across air intake filter, and the general condition of the engine intake and exhaust valves are just some of the variables which will determine the degree of exhaust emission. The prior art has suggested various means, methods and apparatus for reducing exhaust emissions due to the aforementioned factors. However, even with the adoption of such proposals by the prior art, it has been found that problems still existed with regard to meeting such governmentally imposed limits of exhaust emissions.

It has now been discovered that there is another factor which can lead to increased exhaust emission regardless of how precisely or carefully the engine components are manufactured and regardless of how carefully and precisely the carburetor or other fuel metering device, to be used with such an engine, are manufactured and calibrated.

Such an additional factor is the unauthorized tampering with certain of the metering restrictions (which were precisely determined during manufacture) by individuals, after the carburetor or other fuel metering device has been sold and placed into actual use. Such individuals were found to often "adjust" the carburetor or other fuel metering device in order to obtain what they considered "better" engine performance.

This usually meant that such individuals tried to obtain a richer (more) fuel flow to the engine than that as established by the engine and/or carburetor and/or fuel control manufacturer. The system within, for example, the carburetor which could be most easily manipulated by such individuals is the idle fuel system since it possessed an adjustable needle valve generally in the idle fuel discharge port.

The elimination of such adjustable needle valves would, in turn, create serious difficulties in attempting to properly calibrate the carburetor during its manufacture and, attendantly, greatly increase the cost thereof.

Accordingly, the invention as herein disclosed and claimed is primarily directed to the solution of the problems arising relative to and out of such adjustable needle-type valves as well as other related and attendant problems. However, it should be made clear that even though the problem of unauthorized tampering type of adjustments of needle-type valves gave rise to the invention, neither the invention nor the practice thereof is limited to needle-type valve structures nor to any type of fuel metering or supply apparatus.

SUMMARY OF THE INVENTION

According to the invention, a fuel system for metering fuel to an associated engine and which comprises a needle valve cooperating with a discharge passage for thereby metering the rate of fuel flow through such discharge passage to said engine has body means defining the discharge passage as well as supporting said needle valve, and cover-like or plug-like capping means are provided to preclude access to the needle-valve once such needle valve is selectively adjusted relative to the cooperating discharge passage.

Various general and specific objects, advantages and aspects of the invention will become apparent when reference is made to the following detailed description considered in conjunction with the accompanying drawings.

BRIEF DESCRIPTION OF THE DRAWINGS

In the drawings, wherein for purposes of clarity certain details and/or elements may have been eliminated from one or more views:

FIG. 1 is a side elevational view illustrating a fuel control or metering apparatus, such as a carburetor, with parts thereof broken away and in cross-section, embodying teachings of the invention;

FIG. 2 is an enlarged axial cross-sectional view of a portion of the structure shown in FIG. 1;

FIG. 3 is an axial end view of a portion of the structure of FIG. 2 taken generally on the plane of line 3—3 of FIG. 2 and looking in the direction of the arrows;

FIG. 4 is a cross-sectional view taken generally on the plane of line 4—4 of FIG. 2 and looking in the direction of the arrows;

FIG. 5 is a side elevational view of a modification of the invention shown in FIGS. 2, 3 and 4, with a portion thereof broken away;

FIG. 6 is a view similar to that of FIG. 4 and illustrating a second embodiment of the invention;

FIG. 7 is a cross-sectional view taken generally on the plane of line 7—7 of FIG. 6 and looking in the direction of the arrows;

FIG. 8 is a side elevational view of, for example, one of the elements shown in FIGS. 6 and 7 and illustrating a further modification;

FIGS. 9 and 10 are end elevational views taken generally on the planes of line 9—9 and line 10—10, respectively, of FIG. 8 and looking in the directions of the arrows;

FIG. 11 is a view similar to that of FIGS. 4 and 6 and illustrating a further embodiment of the invention; and FIG. 12 is a cross-sectional view taken generally on the plane of line 12—12 of FIG. 11 and looking in the direction of the arrows.

DETAILED DESCRIPTION OF THE PREFERRED EMBODIMENTS

Referring now in greater detail to the drawings, FIG. 1 illustrates a carburetor 10 having body means 12 through which is formed induction passage means 14 with an air inlet end 16 and a discharge end 18 which communicates as with an inlet 20 of the intake passage means 22 of an associated inlet or intake manifold 24 of a related combustion engine 26. The induction passage means 14 may comprise venturi means 28 generally within which a main fuel discharge nozzle 30, comprising booster-like venturi means 32 and 34, is situated.

A choke valve 36, operable to regulate intake air flow, is suitably rotatably mounted on and to a choke shaft 38 suitable rotatably journalled in body means 12. Somewhat similarly a throttle valve 40 is located generally in the discharge end of induction passage means 14 and suitably fixedly secured to a transversely extending rotatable throttle shaft 42 as to be thereby variably selectively positionable within the induction passage means as to accordingly control the flow of motive or combustible fluid from the fuel metering means 10 and into the intake passage means 22.

The body means 12 may be provided with a fuel bowl or reservoir 44 having a fuel inlet 46 provided as with a screen 48 situated within an inlet recess 50. Fuel inlet valving means 52 comprises a needle-like valve member 54 having a tapered end 56 in displaceable contact with a cooperating valve seat of a valve body structure 58. A float member 60 having a float arm 62, pivotally mounted as at 64, is operatively connected to needle valve 54 as to thereby be effective for actuating needle valve 54 and maintain a generally constant fuel level within the fuel reservoir 44. Fuel may be supplied to the reservoir 44 as from a related fuel tank 66 and associated fuel pump means 68 situated in, as for example, interconnecting conduit means 70.

A fuel metering orifice 72 leads from the fuel bowl or reservoir 44 to an upwardly inclined main fuel passage 74 which terminates in the main fuel discharge nozzle 30 discharging as into the primary booster venturi 32. Fuel flow from the reservoir 44 through orifice 72 into fuel passage 74 is controlled as by an associated metering rod 76 having a stepped or otherwise contoured end 78 positioned in the orifice 72 as to cooperate therewith in defining a variably selected effective metering area. Axial movement of rod 76 to position different portions of contoured end 78 in orifice 72 provides a change in the rate of metered fuel flow through such orifice means 72 because of the resulting change in the effective metering area.

The carburetor or charge forming device 10 also comprises an idle fuel metering and supply system which may comprise idle fuel discharge port means 80 opening and discharging into induction passage means 14 downstream or posterior to throttle valve means 40. The idle system may also comprise an idle fuel well 82 communicating with an extending generally upwardly from the main fuel passage 74. The well 82 may generally surround a metering tube 84 which, as at its upper end, communicates with passage or conduit means 86. As shown, the idle conduit means 86 may communicate first with a chamber 88 and from there with idle port or passage 80 as by a conduit portion 87. Chamber 88, in turn, is placed in communication with the induction passage means 14 as by aperture or slot means 90 situated generally upstream of the throttle valve 40, when closed, as to thereby become progressively opened to communication with the downstream portion of the induction passage means 14 as throttle valve 40 is progressively opened from its curb idle condition. After formation of chamber 88, the outer end thereof may be sealed as by suitable access-like closure means 92. As can be seen in FIG. 1, idle fuel passage 87 extends downwardly as to communicate with discharge conduit or aperture means 80 through an intermediate chamber-like portion 94 which, in turn, generally ecompasses an adjustable valve member 96.

Referring in greater detail to FIG. 2, valve member 96 may comprise a shank-like body portion 98 which has an enlarged externally threaded portion 100 threadably engaging an internally threaded portion 102 carried as within body or housing means 12. If desired, cooperating internal slidable guide means 104 may be provided for effectively guiding the shank portion 98 and the contoured valving surface 106 carried at the end thereof and effective for cooperating with discharge orifice means 80 for establishing a desired effective metering flow area therethrough.

Preferably, the needle or valve member 96 is provided with a split slot 108 which is effective for operatively engaging the blade of a cooperating screw-driver or some other functionally equivalent tool whereby the member 96 may be threadably rotated as to thereby result in valving surface 106 being adjustably located at the desired position relative to orifice means 80. Further, in the preferred arrangement, the body portion, carrying the external threaded portion 100, in the general axial vicinity of the slot 108, is somewhat radially outwardly deformed in its free state to thereby result in some degree of frictional binding in order to assure that once the position of the valve member is adjustably selected that such position will be subsequently maintained.

The sealing or closure plug means 110 is press-fitted as into a counterbore 112 thereby effectively preventing direct access to the needle valve means 98. In the preferred embodiment, the closure or sealing means 110 is illustrated as comprising a metal, preferably steel, retainer means 114 which, as depicted, may be of cup-like configuration. The open end of the cylindrical side wall 116 is preferably mechanically rolled or spun over into a configuration as generally depicted at 118 thereby effectively axially trapping or containing a disc-like plug-like member 120 within the retainer means 114. In the preferred embodiment, plug or closure member 120 is formed of hardened steel and is contained within retainer means 114 as to be rotatable with respect thereto. This does not necessarily mean that plug or closure member 120 must, under all conditions, be loose with respect to retainer 114 but rather that such closure member 120 will be at least rotatable with respect thereto upon the application of, for example, a minimal torque force as against surface or axial face 122 of closure member 120.

GENERAL OPERATION

Preferably, the plug or closure means 110 is formed into the assembly of retainer means 114 and closure member 120, with the rolled-over portion 118, prior to the introduction of such closure means 110 into counterbore 112. Once thusly assembled into counterbore 112 the press-fit or interference type fit between the outer diameter of retainer means 114 and the inner diameter or surface of counterbore effectively prevents the subsequent withdrawal of the closure means 110 from the bore 112. In the event someone should try to drill away the closure member 120, upon application of the drill bit point to surface or face 112 of closure or plug member 120, the rotational torque of the drill bit will cause rotation of the plug member 120 as within the retainer means 114 with the result that no drilling action will occur in the closure member 120. Accordingly, since the assembly or means 110 cannot be withdrawn from passage means 122 after its introduction therein and since the rotation of plug or closure member 120 prevents such from being drilled-through, the closure means 110 prevents access to and the unauthorized adjustment of or tampering with the needle valve means 96.

FIG. 5 illustrates, by way of example, that the retainer means 114 may be provided with suitable means 124 formed on, or comprising a portion of, the external surface of such retainer means 114 as to enhance the gripping action as between retainer means 114 and the coacting surface of passage 112. Such gripping means 124 may be, for example, a knurled portion or any other suitable contour which would provide enhanced frictional resistance upon any attempt to withdraw closure means 110 from the passage 112.

FIGS. 6 and 7 illustrate a second embodiment of the invention. Elements in FIGS. 6 and 7 which are like or functionally similar to those of FIGS. 1-5 are identified with like reference numbers provided with a suffix "a" and only so much of the structure of the preceding Figures is shown as is believed to be necessary and adequate to understand the said second embodiment.

In the embodiment of FIGS. 6 and 7, the closure or plug member 120a is illustrated as comprising a first disc-like body portion 126 and a second disc-like body portion 128 which are interconnected as by an annular necked-down or groove means 130. The open end of the retainer means side wall portion 116a is turned radially inwardly as to form a flange portion 132 received within such groove means 130. As a consequence, the outermost end of retainer means 114a is effectively hidden by the disc body portion 128 thereby further preventing any possible damage to the retainer means 114a in any attempt to remove such from passage means 112a. As depicted, in the preferred form of the embodiment of FIGS. 6 and 7, the outer diameter 134 of disc body portion 128 is significantly larger than that of disc body portion 126 and is of a dimension effectively covering the projecting axial end of retainer means 114a.

FIGS. 8, 9 and 10 illustrate a further modification of the invention. Elements in FIGS. 8, 9 and 10 which are like or functionally similar to those of FIGS. 1-7 are identified with like reference numerals provided with a suffix "b".

Referring in greater detail to FIGS. 8, 9 and 10, it can be seen that the retainer means 114b, even though still of generally cup-shaped configuration, is provided with a plurality of slotted portions 136 formed as in the wall 116b and flange 132b thereby providing some greater degree of radial resilient deflection as between adjacent portions of the wall 116b and as between adjacent portions of the flange 132b if such be desired as to possibly enhance introduction of the retainer means 114b (and plug member constrained thereby) into the coacting passage as, for example, 112a (FIG. 6).

FIGS. 11 and 12 illustrate a third embodiment of the invention. Elements in FIGS. 11 and 12 which are like or functionally similar to those of preceding Figures are identified with like reference numerals provided with a suffix "c".

Referring in greater detail to FIGS. 11 and 12, the body or structure 12c forming passage means 112c is illustrated as being provided with an annular, radially outwardly extending, groove or recess 138 which, in turn, receives retainer means 140 therein. In the form depicted, the retainer means 140 may be, for example, a C-type snap ring with a centrally disposed aperture-like portion 142. Preferably, the leading or inner-most end of plug means 120c is provided with a chamfer 144 which upon being first introduced into the aperture portion 142 causes the retainer means 140 to radially expand and thereby permit the passage of disc body portion 126c therethrough and eventually permitting the retainer means 140 to become simultaneously seated or confined by grooves 138 and 130c. As should be appreciated, retainer means 140 serves the same functions as, for example, retainer means 114a of FIGS. 6 and 7 and, in such embodiment, more particularly, flange portion 132 thereof.

Although only a preferred embodiment and other selected embodiments modifications of the invention have been disclosed and described, it is apparent that other embodiments and modifications of the invention are possible within the scope of the appended claims.

What is claimed is:

1. A fuel metering system effective for metering the rate of fuel flow to an associated combustion engine, comprising body means, conduit means formed in said body means communicating with a source of fuel, orifice means formed generally in said body means for receiving fuel from said conduit means and discharging said fuel into induction passage means associated with said engine, an opening formed in said body means, said opening receiving adjustably positionable valve means, said valve means being selectively adjustably positionable with respect to said orifice means in order to thereby cooperate with said orifice means in order to cooperatingly define an effective metering area for metering said rate of said fuel flow from said conduit means and to said induction passage means, and closure means received in said opening as to effectively close said opening to access to said valve means, said closure means comprising retainer means, and a closure member operatively retained by said retainer means against withdrawal of said closure member from said opening, said closure member being rotatable with respect to said body means, said retainer means comprising a cup-like caging member having a generally transverse end wall and a generally cylindrical wall joined thereto and terminating in an open end, said closure member comprising a first closure member body portion and a second closure member body portion, an intermediate closure member body portion of transverse dimension less than that of either said first or second closure member body portions and operatively joining said first and second closure member body portions, said cylindrical wall of said cup-like caging member being formed generally radially inwardly as to define a flange-like portion having a second opening in said open end, said intermediate closure member body portion being generally received within said second opening, said first closure member body portion being contained within said cup-like caging member, and said second closure member body portion being situated externally of said cup-like caging member, said first closure member body portion being of a dimension precluding withdrawal of said first closure member body portion through said second opening, and said second closure member body portion being of a dimension precluding insertion into said cup-like caging member through said second opening of said cup-like caging member.

2. A fuel metering system according to claim 1 wherein said cup-like caging member is tightly engaged in said opening by means of said cylindrical wall frictionally engaging said opening, wherein said second closure member body portion is of generally cylindrical configuration having an outer cylindrical surface, and wherein said cylindrical surface of said second closure member body portion is in close proximity to said opening.

3. A fuel metering system according to claim 2 and further comprising a plurality of slots formed in said flange-like portion.

4. A fuel metering system according to claim 2 and further comprising a plurality of slots formed in said cylindrical wall of said caging member.

5. A fuel metering system according to claim 2 and further comprising a plurality of slots formed in said cylindrical wall of said caging member and in said flange-like portion.

6. Closure means for effectively closing access passage means to prevent unauthorized access through said passage means, said closure means comprising retainer means adapted to be fixedly retained within said passage means, and a closure member operatively retained by said retainer means against withdrawal of said closure member from said passage means, said closure member being rotatable with respect to said passage means, said retainer means comprising a cup-like caging member having a generally transverse end wall and a generally cylindrical wall joined thereto and terminating in an open end, said closure member comprising a first closure member body portion and a second closure member body portion, an intermediate closure member body portion of transverse dimension less than that of either said first or second closure member body portions and operatively joining said first and second closure member body portions, said cylindrical wall of said cup-like caging member being formed generally radially inwardly as to define a flange-like portion having an opening in said open end, said intermediate closure member body portion being generally received within said opening, said first closure member body portion being contained within said cup-like caging member, said second closure member body portion being situated externally of said cup-like caging member, said first closure member body portion being of a size and configuration precluding withdrawal of said first closure member body portion through said opening, and said second closure member body portion being of a size and configuration precluding insertion into said cup-like caging member through said opening of said cup-like caging member.

7. Closure means according to claim 6 wherein said second closure member body portion is of generally cylindrical configuration having an outer cylindrical surface, and wherein said cylindrical surface nearly approaches the diametrical dimension of said cylindrical wall of said cup-like caging member.

* * * * *